(12) United States Patent
Masai (10) Patent No.: US 12,266,322 B2
(45) Date of Patent: Apr. 1, 2025

(54) VOLTAGE GENERATION CIRCUIT AND CONTROL DEVICE

(71) Applicant: LAPIS Technology Co., Ltd., Yokohama (JP)

(72) Inventor: Hideki Masai, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/603,180

(22) Filed: Mar. 12, 2024

(65) Prior Publication Data

US 2024/0312426 A1 Sep. 19, 2024

(30) Foreign Application Priority Data

Mar. 14, 2023 (JP) ................. 2023-039573

(51) Int. Cl.
  *G09G 3/36* (2006.01)
  *G09G 3/20* (2006.01)
  *H02M 3/07* (2006.01)

(52) U.S. Cl.
  CPC ............ *G09G 3/3648* (2013.01); *H02M 3/07* (2013.01); *G09G 3/2096* (2013.01); *G09G 2330/02* (2013.01)

(58) Field of Classification Search
  CPC ............ G09G 2330/02; G09G 3/2096; G09G 3/3648; H02M 3/07
  See application file for complete search history.

(56) References Cited

U.S. PATENT DOCUMENTS

2013/0162337 A1* 6/2013 Chien ................. H02M 3/073
  327/536
2015/0049008 A1* 2/2015 Wu ..................... G09G 3/3648
  345/87

FOREIGN PATENT DOCUMENTS

JP 2008211963 9/2008

* cited by examiner

*Primary Examiner* — Hong Zhou (74) *Attorney, Agent, or Firm* — JCIPRNET (57) ABSTRACT

A charge pump circuit includes: first and second capacitors; a first switch element group turned on and off by a first clock signal and connecting a first voltage supply line and the first capacitor when turned on; a second switch element group turned on and off by the first clock signal and connecting a second voltage supply line and the second capacitor when turned on; and a third switch element group turned on and off by a second clock signal and connecting a voltage output line and the first and second capacitors when turned on. A control circuit controls a timing of a signal change of a first enable signal so that the signal levels of the first and second clock signals are fixed when the first and second switch element groups change from off to on, in response to stopping oscillating the first and second clock signals.

8 Claims, 11 Drawing Sheets

VOLTAGE GENERATION CIRCUIT AND CONTROL DEVICE

CROSS-REFERENCE TO RELATED APPLICATION

This application claims the priority benefits of Japanese application no. 2023-039573, filed on Mar. 14, 2023. The entirety of the above-mentioned patent application is hereby incorporated by reference herein and made a part of this specification.

BACKGROUND

Technical Field

The disclosure relates to a voltage generation circuit and a control device.

Description of Related Art

In liquid crystal display devices, the power supply voltage for a gate driver is generated by a voltage generation circuit provided in a T-CON (Timing Controller) or a source driver. A dual charge pump composed of a first charge pump and a second charge pump that have a common output and operate in opposite phases, for example, has been used as the configuration of such a voltage generation circuit (for example, Patent Document 1 (Japanese Patent Application Laid-Open No. 2008-211963)).

In a dual charge pump circuit as described in the conventional technology above, in order to prevent a through current from occurring in the transistors forming the first and second charge pumps when switching from the charge state to the pump state and from the pump state to the charge state, a Hiz period is provided by delaying a clock signal. Since each charge pump is switched between the charge state and the pump state through the Hiz period, generation of a through current can be prevented during normal operation.

However, when an enable signal (or disable signal) is supplied to each charge pump to stop the operation, either the first charge pump or the second charge pump switches from the pump state to the charge state without passing through the Hiz period, so a through current would occur.

The disclosure provides a voltage generation circuit including a dual charge pump circuit, which is capable of preventing generation of a through current when the operation of a charge pump stops.

SUMMARY

A voltage generation circuit according to an embodiment of the disclosure includes: a charge pump circuit configured to boost an input voltage to generate an output voltage; a signal supply circuit configured to supply to the charge pump circuit a first clock signal and a second clock signal, which are a pair of signals controlling an operation of the charge pump circuit and in which a predetermined time difference is provided between a timing of a change in signal level of one signal and a timing of a change in signal level of the other signal; and a control circuit configured to supply to the signal supply circuit a first enable signal that controls start and stop of oscillation of the first clock signal and the second clock signal according to a change in signal level. The charge pump circuit includes: a first capacitor and a second capacitor each having a predetermined capacitance; a first switch element group configured to be turned on and off in response to application of the first clock signal and connect a first voltage supply line and the first capacitor when turned on; a second switch element group configured to be turned on and off in response to application of the first clock signal and connect a second voltage supply line and the second capacitor when turned on; and a third switch element group configured to be turned on and off in response to application of the second clock signal and connect a voltage output line of the output voltage and the first capacitor and the second capacitor when turned on. The control circuit is configured to control a timing of a signal change of the first enable signal so that the signal levels of the first clock signal and the second clock signal are fixed at a timing when the first switch element group and the second switch element group change from an off state to an on state, in response to stopping oscillation of the first clock signal and the second clock signal.

Further, a control device according to an embodiment of the disclosure is configured to supply a power supply voltage to a gate driver and control an operation of the gate driver. The gate driver is connected to a display panel, which includes a plurality of data lines, a plurality of gate lines, and a plurality of pixel portions provided in a matrix respectively at intersections of the plurality of data lines and the plurality of gate lines, and the gate driver is configured to supply a gate signal to the plurality of gate lines. The control device includes: a charge pump circuit configured to boost an input voltage to generate the power supply voltage; a signal supply circuit configured to supply to the charge pump circuit a first clock signal and a second clock signal, which are a pair of signals controlling an operation of the charge pump circuit and in which a predetermined time difference is provided between a timing of a change in signal level of one signal and a timing of a change in signal level of the other signal; and a control circuit configured to supply to the signal supply circuit a first enable signal that controls start and stop of oscillation of the first clock signal and the second clock signal according to a change in signal level. The charge pump circuit includes: a first capacitor and a second capacitor each having a predetermined capacitance; a first switch element group configured to be turned on and off in response to application of the first clock signal and connect a first voltage supply line and the first capacitor when turned on; a second switch element group configured to be turned on and off in response to application of the first clock signal and connect a second voltage supply line and the second capacitor when turned on; and a third switch element group configured to be turned on and off in response to application of the second clock signal and connect a voltage output line of the power supply voltage and the first capacitor and the second capacitor when turned on. The control circuit is configured to control a timing of a signal change of the first enable signal so that the signal levels of the first clock signal and the second clock signal are fixed at a timing when the first switch element group and the second switch element group change from an off state to an on state, in response to stopping oscillation of the first clock signal and the second clock signal.

DESCRIPTION OF THE EMBODIMENTS

Embodiments of the disclosure will be described hereinafter with reference to the drawings. In the following description of the embodiments and the accompanying drawings, substantially the same or equivalent parts are denoted by the same reference numerals.

The voltage generation circuit according to the disclosure makes it possible to prevent generation of a through current when the operation of the charge pump stops.

Figure 1:
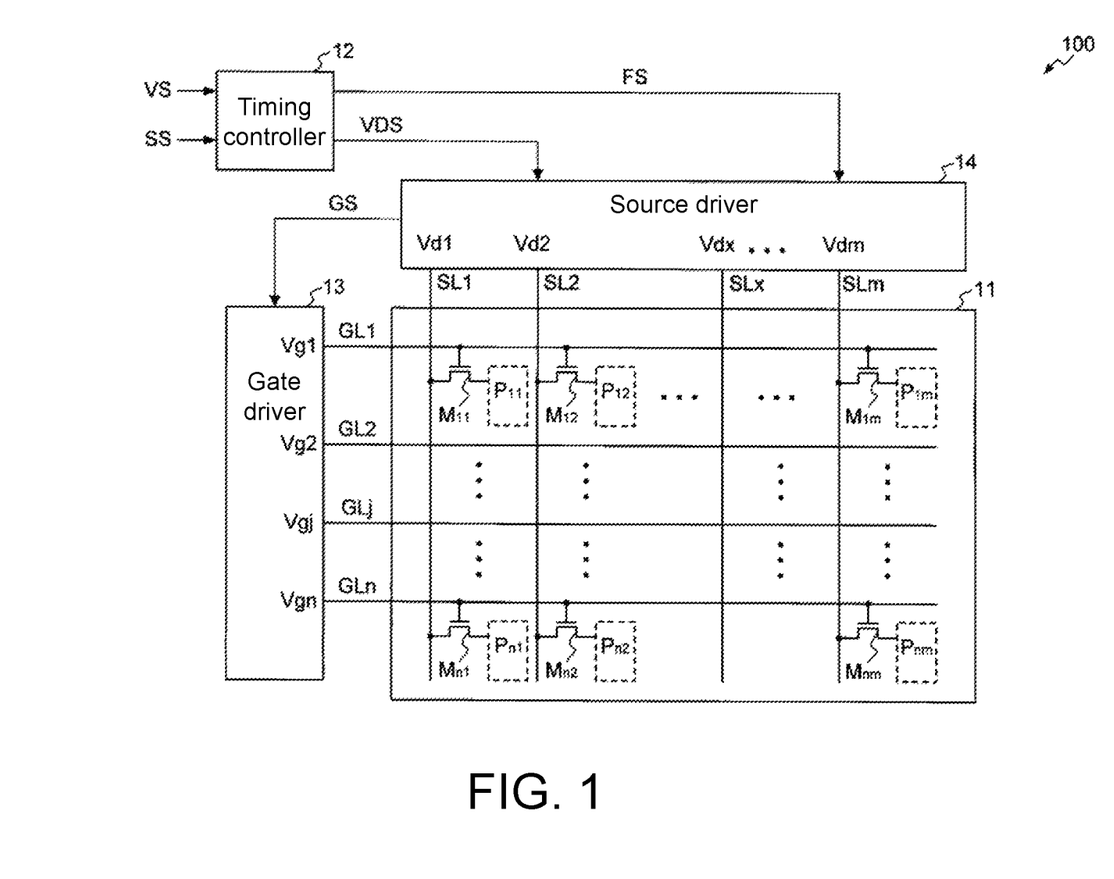
FIG. 1 is a block diagram showing the configuration of the display device of the disclosure.

FIG. 1 is a block diagram showing the configuration of a display device 100 including a voltage generation circuit according to the disclosure. The display device 100 includes a display panel 11, a timing controller 12, a gate driver 13, and a source driver 14.

The display panel 11 is composed of a semiconductor substrate in which a plurality of pixel portions $P_{11}$ to $P_{nm}$ and pixel switches $M_{11}$ to $M_{nm}$ (n, m: a natural number of 2 or more) are arranged in a matrix. The display panel 11 includes n gate lines GL1 to GLn, each of which is a scanning line extending in the horizontal direction, and m source lines SL1 to SLm, which are data lines arranged to intersect with the gate lines GL1 to GLn. The pixel portions $P_{11}$ to $P_{nm}$ and the pixel switches $M_{11}$ to $M_{nm}$ are provided at the intersections of the gate lines GL1 to GLn and the source lines SL1 to SLm.

The pixel switches $M_{11}$ to $M_{nm}$ are controlled to be turned on or off according to gate signals Vg1 to Vgn supplied from the gate driver 13.

The pixel portions $P_{11}$ to $P_{nm}$ are supplied with gradation voltages (drive voltages) corresponding to video data from the source driver 14. Specifically, when the source driver 14 outputs gradation voltage signals Vd1 to Vdm to the source lines SL1 to SLm and the pixel switches $M_{11}$ to $M_{nm}$ are respectively turned on, the gradation voltage signals Vd1 to Vdm are applied to the pixel portions $P_{11}$ to $P_{nm}$. As a result, each pixel electrode of the pixel portions $P_{11}$ to $P_{nm}$ is charged, and the brightness is controlled.

Each of the pixel portions $P_{11}$ to $P_{nm}$ includes a transparent electrode connected to the source lines SL1 to SLm via the pixel switches $M_{11}$ to $M_{nm}$, and a liquid crystal sealed between the semiconductor substrate and a counter substrate that is provided to face the semiconductor substrate and has one transparent electrode formed over the entire surface. For the backlight inside the display device, display is performed by changing the transmittance of the liquid crystal according to the potential difference between the gradation voltages (drive voltages) applied to the pixel portions $P_{11}$ to $P_{nm}$ and the counter substrate voltage.

The timing controller 12 generates a series of pixel data pieces PD (serial signal) representing the brightness level of each pixel using, for example, 8-bit brightness gradation in 256 steps based on video data VS. Further, the timing controller 12 generates an embedded clock type clock signal CLK having a constant clock cycle based on a synchronization signal SS. The timing controller 12 generates a video data signal VDS, which is a serial signal that integrates the series of pixel data pieces PD and the clock signal CLK, and supplies the video data signal VDS to the source driver 14 to control display of the video data. The video data signal VDS is configured as a video data signal serialized according to the number of transmission lines for each predetermined number of source lines.

In this embodiment, the video data signal VDS for one frame is constructed by serially continuing n pixel data piece groups each composed of m pixel data pieces PD. Each of the n pixel data piece groups is a pixel data piece group composed of pixel data pieces corresponding to the gradation voltages to be supplied to the pixels on one horizontal scanning line (that is, each of the gate lines GL1 to GLn). Through the operation of the source driver 14, the gradation voltage signals Vd1 to Vdm, which are supplied to n×m pixel portions (that is, pixel portions $P_{11}$ to $P_{nm}$), are applied via the source lines based on m×n pixel data pieces PD.

Further, the timing controller 12 generates a frame synchronization signal FS indicating the timing of each frame of the video data signal VDS based on the synchronization signal SS, and supplies the frame synchronization signal FS to the source driver 14.

The gate driver 13 operates by receiving a gate driver power supply voltage VLOUT and a gate control signal GS from the source driver 14, and sequentially supplies the gate signals Vg1 to Vgn to the gate lines GL1 to GLn based on the clock timing included in the gate control signal GS. By supplying the gate signals Vg1 to Vgn, the pixel portions $P_{11}$ to $P_{nm}$ are selected for each pixel row. Then, by applying the gradation voltage signals Vd1 to Vdm from the source driver 14 to the selected pixel portions, the gradation voltages are written to the pixel electrodes.

In other words, through the operation of the gate driver 13, m pixel portions arranged along the extending direction of the gate lines (that is, in one horizontal row) are selected as the targets to be supplied with the gradation voltage signals Vd1 to Vdm. The source driver 14 applies the gradation voltage signals Vd1 to Vdm to the selected pixel portions in one horizontal row, and displays colors according to the voltages. By repeating this in the extending direction of the source lines (that is, the vertical direction) while selectively switching the selected pixel portions in one horizontal row to be supplied with the gradation voltage signals Vd1 to Vdm, the screen for one frame is displayed.

The source driver 14 receives the video data signal VDS from the timing controller 12, generates the gradation voltage signals Vd1 to Vdm corresponding to multi-level gradation voltages according to the number of gradations indicated in the video data signal VDS, and applies the gradation voltage signals Vd1 to Vdm to the pixel portions $P_{11}$ to $P_{nm}$ via the source lines SL1 to SLm.

Further, the source driver 14 generates the gate control signal GS and the gate driver power supply voltage VLOUT for controlling the operation of the gate driver 13, and supplies the gate control signal GS and the gate driver power supply voltage VLOUT to the gate driver 13. The source driver 14 includes a voltage generation circuit that generates the gate driver power supply voltage VLOUT.

Figure 2:
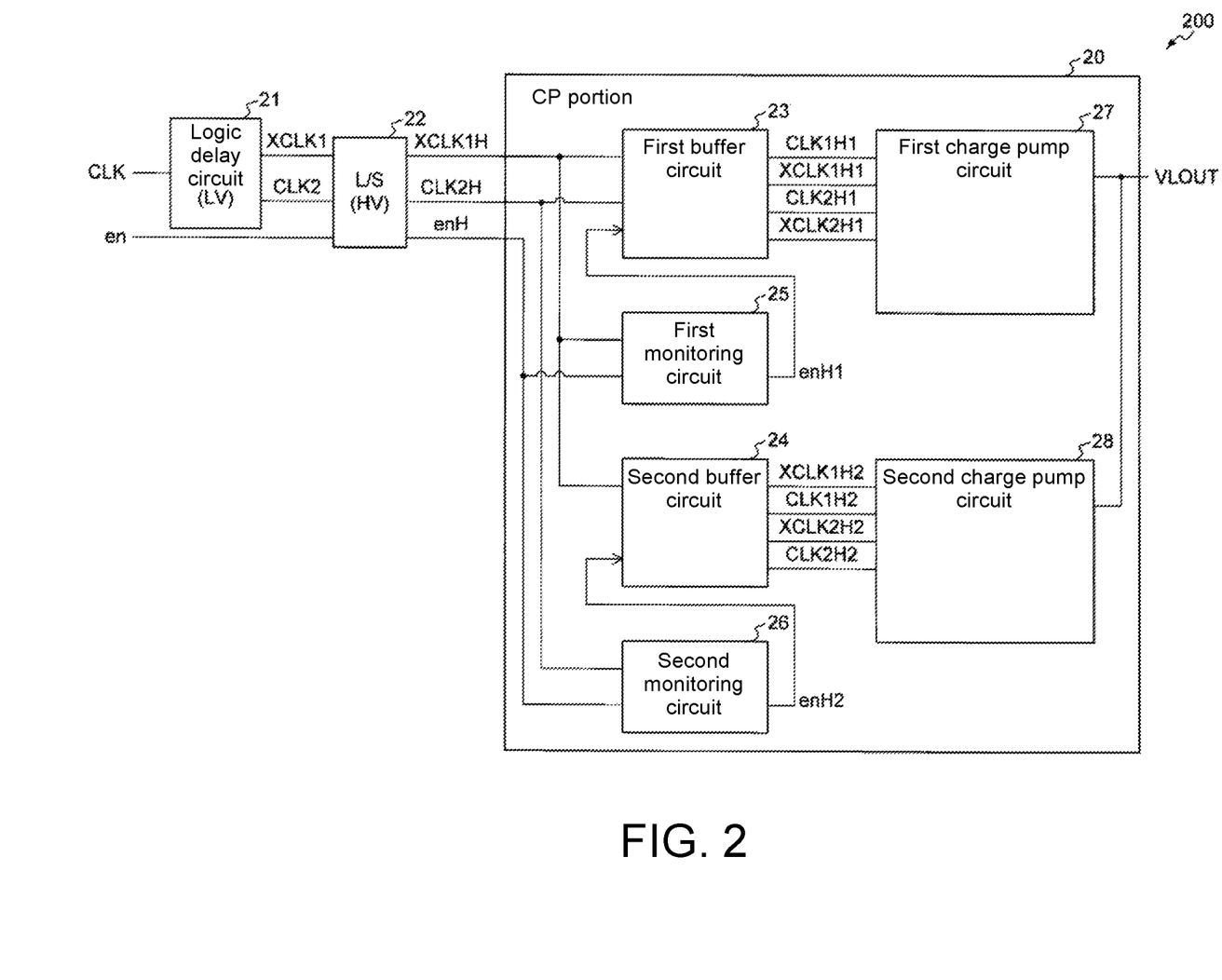
FIG. 2 is a block diagram showing the configuration of the voltage generation circuit of the disclosure.

FIG. 2 is a block diagram showing the configuration of the voltage generation circuit 200 of this embodiment. The voltage generation circuit 200 includes a logic delay circuit 21, a level shifter 22, a first buffer circuit 23, a second buffer circuit 24, a first monitoring circuit 25, a second monitoring circuit 26, a first charge pump circuit 27, and a second charge pump circuit 28. The logic delay circuit 21 is a circuit that operates by receiving a low voltage power supply LV (low voltage). On the other hand, the level shifter 22, the first buffer circuit 23, the second buffer circuit 24, the first monitoring circuit 25, the second monitoring circuit 26, the first charge pump circuit 27, and the second charge pump circuit 28 are circuits that operate by receiving a high voltage power supply HV (high voltage).

The logic delay circuit 21 is a circuit that receives input of the clock signal CLK, and generates an inverted first clock signal XCLK1 and a second clock signal CLK2. The logic delay circuit 21 includes a NAND gate circuit and an OR gate circuit.

Figure 3:
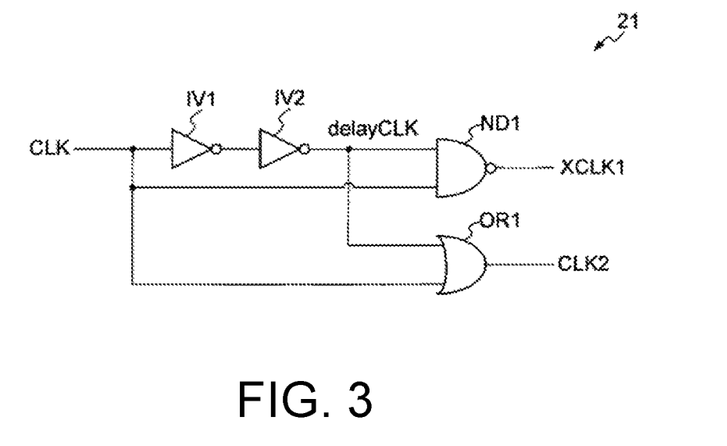
FIG. 3 is a circuit diagram showing the configuration of the logic delay circuit.

FIG. 3 is a circuit diagram showing the configuration of the logic delay circuit 21, which includes inverters IV1 and IV2, a NAND gate circuit ND1, and an OR gate circuit OR1. The inverters IV1 and IV2 generate a delayed clock signal delayCLK by delaying the clock signal CLK.

The NAND gate circuit ND1 receives input of the clock signal CLK and the delayed clock signal delayCLK, and generates a signal composed of these NANDs as the inverted first clock signal XCLK1. The OR gate circuit OR1 receives input of the clock signal CLK and the delayed clock signal delayCLK, and generates a signal composed of these ORs as the second clock signal CLK2.

Figure 4:
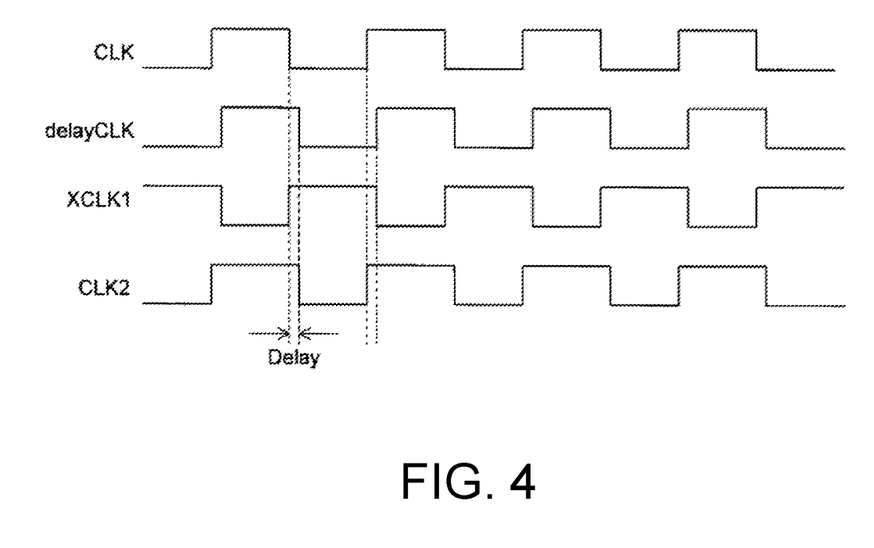
FIG. 4 is a time chart of various clock signals generated by the logic delay circuit.

FIG. 4 is a time chart showing the signal changes of the clock signal CLK, the delayed clock signal delayCLK, the inverted first clock signal XCLK1, and the second clock signal CLK2.

The delayed clock signal delayCLK is a signal obtained by delaying the clock signal CLK by a predetermined period, and has a signal waveform obtained by shifting the phase of the clock signal CLK in the time axis direction by the period indicated as "Delay" in the drawing.

The inverted first clock signal XCLK1 has a signal waveform that rises at the timing of the fall of the clock signal CLK and falls at the timing of the rise of the delayed clock signal delayCLK. The second clock signal CLK2 has a signal waveform that rises at the timing of the rise of the clock signal CLK and falls at the timing of the fall of the delayed clock signal delayCLK.

Referring to FIG. 2 again, the level shifter 22 receives the inverted first clock signal XCLK1, the second clock signal CLK2, and an enable signal en, and shifts these signal levels from LV (low voltage) to HV (high voltage). The enable signal en is a signal asynchronous with the inverted first clock signal XCLK1 and the second clock signal CLK2, and is a signal that controls the start and stop of oscillation of the clock signal used for the operations of the first charge pump circuit 27 and the second charge pump circuit 28.

The level shifter 22 generates an HV inverted first clock signal XCLK1H obtained by shifting the signal level of the inverted first clock signal XCLK1, an HV second clock signal CLK2H obtained by shifting the signal level of the second clock signal CLK2, and an HV enable signal enH obtained by shifting the signal level of the enable signal en.

It should be noted that in the following description, the modifying portions of these signals such as "HV" will be omitted.

The first buffer circuit 23, the second buffer circuit 24, the first monitoring circuit 25, the second monitoring circuit 26, the first charge pump circuit 27, and the second charge pump circuit 28 constitute a charge pump portion (CP portion in the drawing) 20.

Figure 5A:
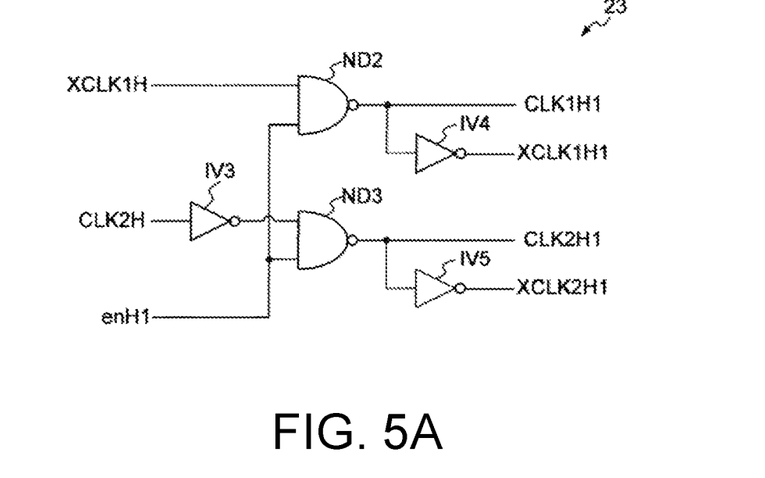
FIG. 5A is a circuit diagram showing the configuration of the first buffer circuit.

FIG. 5A is a circuit diagram showing the configuration of the first buffer circuit 23. The first buffer circuit 23 includes a NAND gate circuit ND2, a NAND gate circuit ND3, an inverter IV3, an inverter IV4, and an inverter IV5.

The NAND gate circuit ND2 receives input of the inverted first clock signal XCLK1H and a first enable signal enH1 output from the first monitoring circuit 25, and outputs these NANDs as a first clock signal CLK1H1. The first clock signal CLK1H1 oscillates when the first enable signal enH1 is at logic level 1, and stops oscillating and is fixed at H level (logic level 1) when the first enable signal enH1 is at logic level 0.

The inverter IV3 receives input of a second clock signal CLK2H, and generates an inverted second clock signal XCLK2H (not shown) obtained by inverting the second clock signal CLK2H.

The NAND gate circuit ND3 receives input of the inverted second clock signal XCLK2H and the first enable signal enH1, and outputs these NANDs as a second clock signal CLK2H1. The second clock signal CLK2H1 oscillates when the first enable signal enH1 is at logic level 1, and stops oscillating and is fixed at H level (logic level 1) when the first enable signal enH1 is at logic level 0.

The inverter IV4 receives input of the first clock signal CLK1H1, and outputs an inverted first clock signal XCLK1H1 obtained by inverting the first clock signal CLK1H1. The inverted first clock signal XCLK1H1 oscillates when the first enable signal enH1 is at logic level 1, and stops oscillating and is fixed at L level (logic level 0) when the first enable signal enH1 is at logic level 0.

The inverter IV5 receives input of the second clock signal CLK2H1, and outputs an inverted second clock signal XCLK2H1 obtained by inverting the second clock signal CLK2H1. The inverted second clock signal XCLK2H1 oscillates when the first enable signal enH1 is at logic level 1, and stops oscillating and is fixed at L level (logic level 0) when the first enable signal enH1 is at logic level 0.

The first buffer circuit 23 is a signal supply circuit that supplies the first clock signal CLK1H1 (and the inverted first clock signal XCLK1H1 obtained by inverting the first clock signal CLK1H1) and the second clock signal CLK2H1 (and the inverted second clock signal XCLK2H1 obtained by inverting the second clock signal CLK2H1) to the first charge pump circuit 27. The operation of the first charge pump circuit 27 is controlled according to the signal level of each clock signal.

Figure 5B:
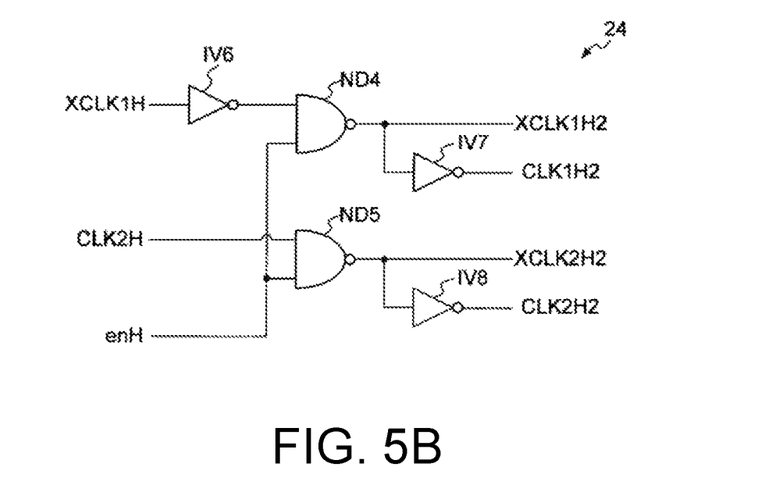
FIG. 5B is a circuit diagram showing the configuration of the second buffer circuit.

FIG. 5B is a circuit diagram showing the configuration of the second buffer circuit 24. The second buffer circuit 24 includes a NAND gate circuit ND4, a NAND gate circuit ND5, an inverter IV6, an inverter IV7, and an inverter IV8.

The inverter IV6 receives input of the inverted first clock signal XCLK1H, and generates a first clock signal CLK1H2 obtained by inverting the inverted first clock signal XCLK1H.

The NAND gate circuit ND4 receives input of the first clock signal CLK1H2 and a second enable signal enH2 output from the second monitoring circuit 26, and outputs these NANDs as an inverted first clock signal XCLK1H2. The inverted first clock signal XCLK1H2 oscillates when the second enable signal enH2 is at logic level 1, and stops oscillating and is fixed at L level (logic level 0) when the second enable signal enH2 is at logic level 0.

The inverter IV7 receives input of the inverted first clock signal XCLK1H2, and outputs a first clock signal CLK1H2 obtained by inverting the inverted first clock signal XCLK1H2. The first clock signal CLK1H2 oscillates when the second enable signal enH2 is at logic level 1, and stops oscillating and is fixed at H level (logic level 1) when the second enable signal enH2 is at logic level 0.

The NAND gate circuit ND5 receives input of the second clock signal CLK2H and the second enable signal enH2, and outputs these NANDs as an inverted second clock signal XCLK2H2. The inverted second clock signal XCLK2H2 oscillates when the second enable signal enH2 is at logic level 1, and stops oscillating and is fixed at L level (logic level 0) when the second enable signal enH2 is at logic level 0.

The inverter IV8 receives input of the inverted second clock signal XCLK2H2, and outputs a second clock signal CLK2H2 obtained by inverting the inverted second clock signal XCLK2H2. The second clock signal CLK2H2 oscillates when the second enable signal enH2 is at logic level 1, and stops oscillating and is fixed at H level (logic level 1) when the second enable signal enH2 is at logic level 0.

The second buffer circuit 24 is a signal supply circuit that supplies the first clock signal CLK1H2 (and the inverted first clock signal XCLK1H2 obtained by inverting the first clock signal CLK1H2) and the second clock signal CLK2H2 (and the inverted second clock signal XCLK2H2 obtained by inverting the second clock signal CLK2H2) to the second charge pump circuit 28. The operation of the second charge pump circuit 28 is controlled according to the signal level of each clock signal. Referring to FIG. 2 again, the charge pump portion 20 includes the first monitoring circuit 25 and the second monitoring circuit 26. The first monitoring circuit 25 is a circuit that receives input of the enable signal enH and generates the first enable signal enH1 based on the enable signal enH. The first monitoring circuit 25 supplies the generated first enable signal enH1 to the first buffer circuit 23.

Figure 6:
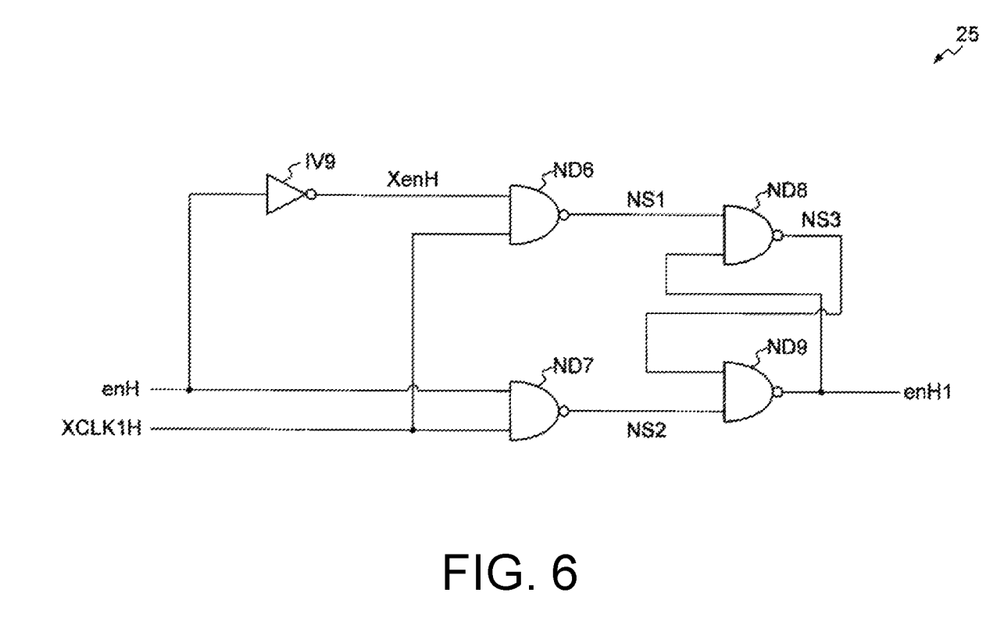
FIG. 6 is a circuit diagram showing the configuration of the first monitoring circuit.

FIG. 6 is a circuit diagram showing the configuration of the first monitoring circuit 25. The first monitoring circuit 25 includes an inverter IV9, a NAND gate circuit ND6, a NAND gate circuit ND7, a NAND gate circuit ND8, and a NAND gate circuit ND9. Since the second monitoring circuit 26 has the same configuration as the first monitoring circuit 25, a description thereof will be omitted here.

The inverter IV9 receives input of the enable signal enH, and generates an inverted enable signal XenH obtained by inverting the enable signal enH. The NAND gate circuit ND6 receives input of the inverted enable signal XenH and the inverted first clock signal XCLK1H, and outputs a NAND signal NS1 composed of these NANDs. The NAND gate circuit ND7 receives input of the enable signal enH and the inverted first clock signal XCLK1H, and outputs a NAND signal NS2 composed of these NANDs. The NAND gate circuit ND8 receives input of the NAND signal NS1, which is the output signal of the NAND gate circuit ND6, and the output signal of the NAND gate circuit ND9, and outputs a signal composed of these NANDs as a NAND signal NS3.

The NAND gate circuit ND9 receives input of the NAND signal NS2, which is the output signal of the NAND gate circuit ND7, and the NAND signal NS3, which is the output signal of the NAND gate circuit ND8, and outputs these NANDs as a first enable signal enH1. The first enable signal enH1 is a signal having the signal level of logic level 0 when the enable signal enH is at logic level 0 and the inverted first clock signal XCLK1H1 is at logic level 0, and having the signal level of logic level 1 in other cases.

Referring to FIG. 2 again, the charge pump portion 20 includes the first charge pump circuit 27 and the second charge pump circuit 28. The first charge pump circuit 27 and the second charge pump circuit 28 are charge pump circuits that boost the input voltage to generate an output voltage. The first charge pump circuit 27 and the second charge pump circuit 28 are charge pump circuits that have a common output and operate in opposite phases, and constitute a so-called dual charge pump circuit.

Figure 7:
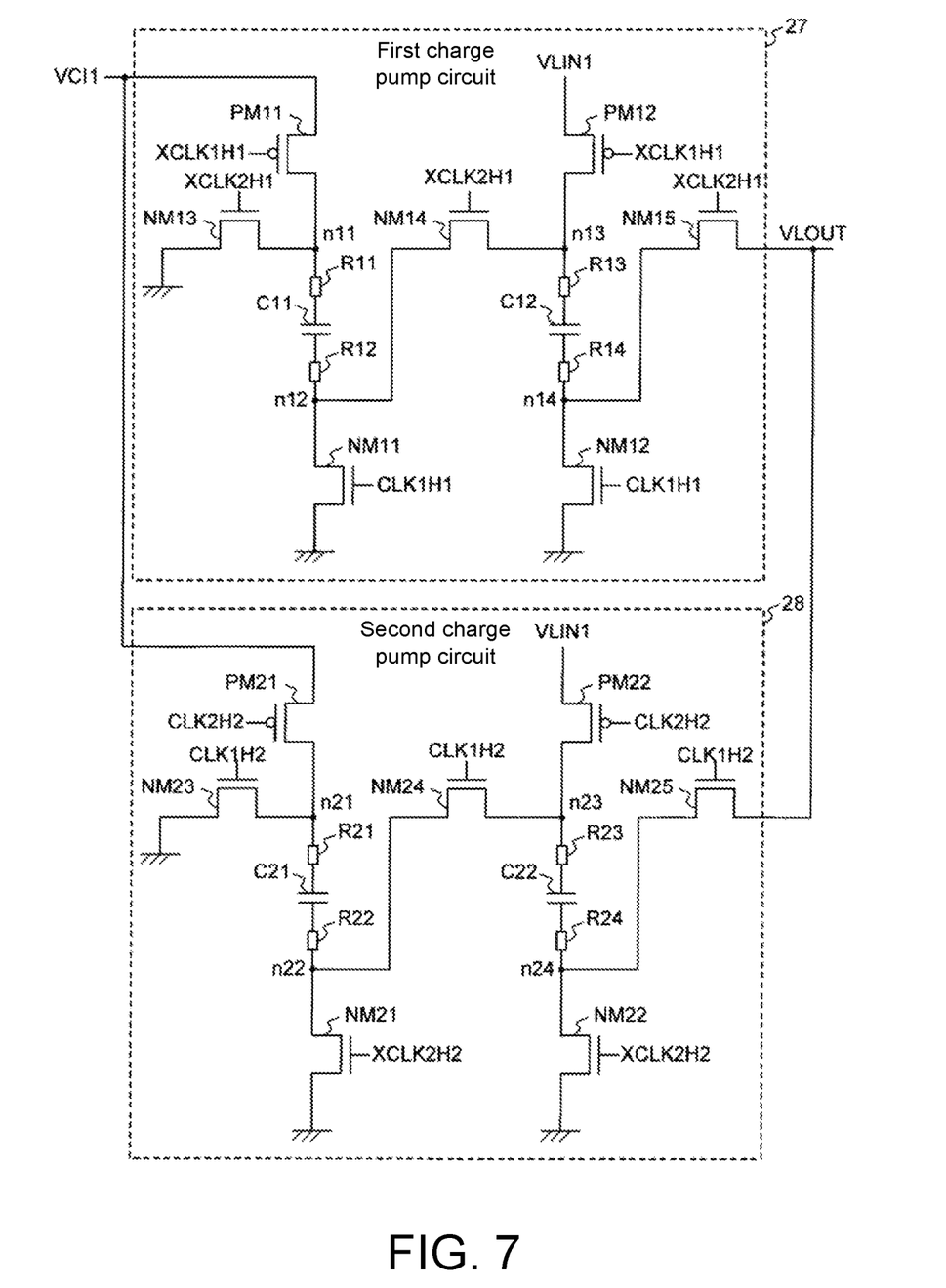
FIG. 7 is a circuit diagram showing the configurations of the first charge pump circuit and the second charge pump circuit.

FIG. 7 is a circuit diagram showing the configurations of the first charge pump circuit 27 and the second charge pump circuit 28.

The first charge pump circuit 27 includes transistors PM11, PM12, NM11, NM12, NM13, NM14, and NM15, capacitors C11 and C12, and resistors R11, R12, R13, and R14.

The transistor PM11 is composed of a P-type MOSFET (metal-oxide-semiconductor field effect transistor), which is a first conductivity type. The source of the transistor PM11 is connected to the voltage supply line of the first input voltage VCI1. The drain of the transistor PM11 is connected to the node n11. The inverted first clock signal XCLK1H1 output from the first buffer circuit 23 is applied to the gate of the transistor PM11.

The transistor NM11 is composed of an N-type MOSFET, which is a second conductivity type. The source of the transistor NM11 is grounded. The drain of the transistor NM11 is connected to the node n12. The first clock signal CLK1H1 output from the first buffer circuit 23 is applied to the gate of the transistor NM11.

The transistors PM11 and NM11 form a first switch element group that is turned on and off in response to application of the inverted first clock signal XCLK1H1 (or the first clock signal CLK1H1 obtained by inverting the inverted first clock signal XCLK1H1), and connects the voltage supply line of the first input voltage VCI1 and the capacitor C11 when turned on.

The transistor PM12 is composed of a P-type MOSFET, which is the first conductivity type. The source of the transistor PM12 is connected to the voltage supply line of the second input voltage VLIN1. The drain of the transistor PM12 is connected to the node n13. The inverted first clock signal XCLK1H1 output from the first buffer circuit 23 is applied to the gate of the transistor PM12.

The transistor NM12 is composed of an N-type MOSFET, which is the second conductivity type. The source of the transistor NM12 is grounded. The drain of the transistor NM12 is connected to the node n14. The first clock signal CLK1H1 output from the first buffer circuit 23 is applied to the gate of the transistor NM12.

The transistors PM12 and NM12 form a second switch element group that is turned on and off in response to application of the inverted first clock signal XCLK1H1 (or the first clock signal CLK1H1 obtained by inverting the inverted first clock signal XCLK1H1), and connects the voltage supply line of the second input voltage VLIN1 and the capacitor C12 when turned on.

The transistor NM13 is composed of an N-type MOSFET, which is the second conductivity type. The source of the transistor NM13 is grounded. The drain of the transistor NM13 is connected to the node n11. The inverted second clock signal XCLK2H1 output from the first buffer circuit 23 is applied to the gate of the transistor NM13.

The transistor NM14 is composed of an N-type MOSFET, which is the second conductivity type. The source of the transistor NM14 is connected to the node n12. The drain of the transistor NM14 is connected to the node n13. The inverted second clock signal XCLK2H1 output from the first buffer circuit 23 is applied to the gate of the transistor NM14.

The transistor NM15 is composed of an N-type MOSFET, which is the second conductivity type. The source of the transistor NM15 is connected to the node n14. The drain of the transistor NM15 is connected to the voltage output line of the gate driver power supply voltage VLOUT. The inverted second clock signal XCLK2H1 output from the first buffer circuit 23 is applied to the gate of the transistor NM15.

The transistors NM13, NM14, and NM15 form a third switch element group that is turned on and off in response to application of the inverted second clock signal XCLK2H1, and connects the voltage output line of the gate driver power supply voltage VLOUT and the capacitors C11 and C12 when turned on.

The capacitor C11 has, for example, a capacitance of 2.2 μF. One end of the capacitor C11 is connected to the node n11 via the resistor R11. The other end of the capacitor C11 is connected to the node n12 via R12.

The capacitor C12 has, for example, a capacitance of 2.2 μF. One end of the capacitor C12 is connected to the node n13 via the resistor R13. The other end of the capacitor C12 is connected to the node n14 via R14.

During the charging operation of the first charge pump circuit 27, the transistors PM11, NM11, PM12, and NM12 are turned on, the transistors NM13, NM14, and NM15 are turned off, and charges are accumulated in the capacitors C11 and C12. During the pumping operation, the transistors PM11, NM11, PM12, and NM12 are turned off, the transistors NM13, NM14, and NM15 are turned on, the charges accumulated in the capacitors C11 and C12 are discharged, and the gate driver power supply voltage VLOUT is output.

The second charge pump circuit 28 includes transistors PM21, PM22, NM21, NM22, NM23, NM24, and NM25, capacitors C21 and C22, and resistors R21, R22, R23, and R24.

The transistor PM21 is composed of a P-type MOSFET, which is the first conductivity type. The source of the transistor PM21 is connected to the voltage supply line of the first input voltage VCI1. The drain of the transistor PM21 is connected to the node n21. The second clock signal CLK2H2 output from the second buffer circuit 24 is applied to the gate of the transistor PM21.

The transistor NM21 is composed of an N-type MOSFET, which is the second conductivity type. The source of the transistor NM21 is grounded. The drain of the transistor NM21 is connected to the node n22. The inverted second clock signal XCLK2H2 output from the second buffer circuit 24 is applied to the gate of the transistor NM21.

The transistor PM22 is composed of a P-type MOSFET, which is the first conductivity type. The source of the transistor PM22 is connected to the voltage supply line of the second input voltage VLIN1. The drain of the transistor PM22 is connected to the node n23. The second clock signal CLK2H2 output from the second buffer circuit 24 is applied to the gate of the transistor PM22.

The transistor NM22 is composed of an N-type MOSFET, which is the second conductivity type. The source of the transistor NM22 is grounded. The drain of the transistor NM22 is connected to the node n24. The inverted second clock signal XCLK2H2 output from the second buffer circuit 24 is applied to the gate of the transistor NM22.

The transistor NM23 is composed of an N-type MOSFET, which is the second conductivity type. The source of the transistor NM23 is grounded. The drain of the transistor NM23 is connected to the node n21. The first clock signal CLK1H2 output from the second buffer circuit 24 is applied to the gate of the transistor NM23.

The transistor NM24 is composed of an N-type MOSFET, which is the second conductivity type. The source of the transistor NM24 is connected to the node n22. The drain of the transistor NM24 is connected to the node n23. The first clock signal CLK1H2 output from the second buffer circuit 24 is applied to the gate of the transistor NM24.

The transistor NM25 is composed of an N-type MOSFET, which is the second conductivity type. The source of the transistor NM25 is connected to the node n24. The drain of the transistor NM25 is connected to the voltage output line of the gate driver power supply voltage VLOUT. The first clock signal CLK1H2 output from the second buffer circuit 24 is applied to the gate of the transistor NM25.

The capacitor C21 has, for example, a capacitance of 2.2 μF. One end of the capacitor C21 is connected to the node n21 via the resistor R21. The other end of the capacitor C21 is connected to the node n22 via R22.

The capacitor C22 has, for example, a capacitance of 2.2 μF. One end of the capacitor C22 is connected to the node n23 via the resistor R23. The other end of the capacitor C22 is connected to the node n24 via R24.

The second charge pump circuit 28 operates in opposite phase to the first charge pump circuit 27, and during the charging operation, the transistors PM21, NM21, PM22, and NM22 are turned on, the transistors NM23, NM24, and NM25 are turned off, and charges are accumulated in the capacitors C21 and C22. During the pumping operation, the transistors PM21, NM21, PM22, and NM22 are turned off, the transistors NM23, NM24, and NM25 are turned on, the charges accumulated in the capacitors C21 and C22 are discharged, and the gate driver power supply voltage VLOUT is output.

As shown in FIG. 4, a time difference is provided by a predetermined delay time (indicated as "Delay" in the drawing) between the timing of signal change of the inverted first clock signal XCLK1 and the timing of signal change of the second clock signal CLK2. Therefore, the same time difference is also generated between the timing of signal change of the inverted first clock signals XCLK1H1 and XCLK1H2 and the first clock signals CLK1H1 and CLK1H2, which are signals shifted to the HV signal level, and the timing of signal change of the second clock signals CLK2H1 and CLK2H2 and the inverted second clock signals XCLK2H1 and XCLK2H2. Therefore, during the normal operation, switching between the charging operation and the pumping operation is performed through the Hiz period. Accordingly, a state in which the transistor PM11 and the transistor NM13 are simultaneously turned on, a state in which the transistors PM12 and NM11 and the transistor NM14 are simultaneously turned on, and a state in which the transistor NM15 and the transistor NM12 are simultaneously turned on do not occur in the first charge pump circuit 27. Thus, no through current is generated in the first charge pump circuit 27 during the normal operation. The same applies to the second charge pump circuit 28.

Furthermore, in the voltage generation circuit 200 of this embodiment, the start and stop of oscillation of each clock signal is controlled based on the first enable signal enH1 generated by the first monitoring circuit 25. The first enable signal enH1 is a signal that falls when the inverted first clock signal XCLK1H1 falls while the enable signal enH falls, and the logic level becomes 0 at the timing when the first charge pump circuit 27 shifts to the charging operation, so no through current is generated even when the operation of the first charge pump circuit 27 is stopped accordingly. This will be explained below.

Figure 8:
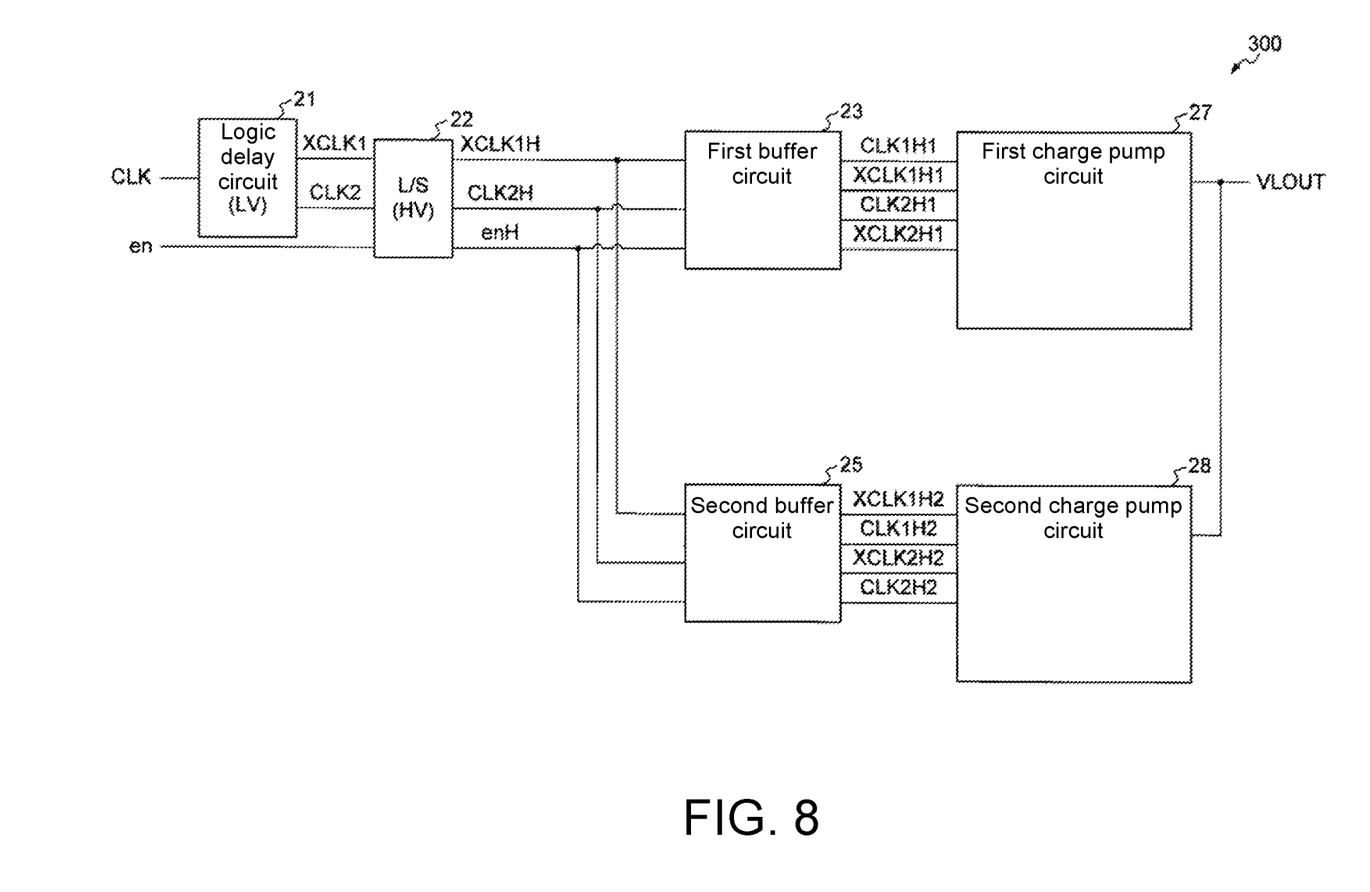
FIG. 8 is a block diagram showing the configuration of the voltage generation circuit of a comparative example.

FIG. 8 is a block diagram showing the configuration of a voltage generation circuit 300 of a comparative example, which does not include the first monitoring circuit 25 and the second monitoring circuit 26 in the voltage generation circuit 200 of this embodiment. In the voltage generation circuit 300 of the comparative example, the start and stop of oscillation of each clock signal is controlled based on changes in the signal level of the enable signal enH.

Figure 9:
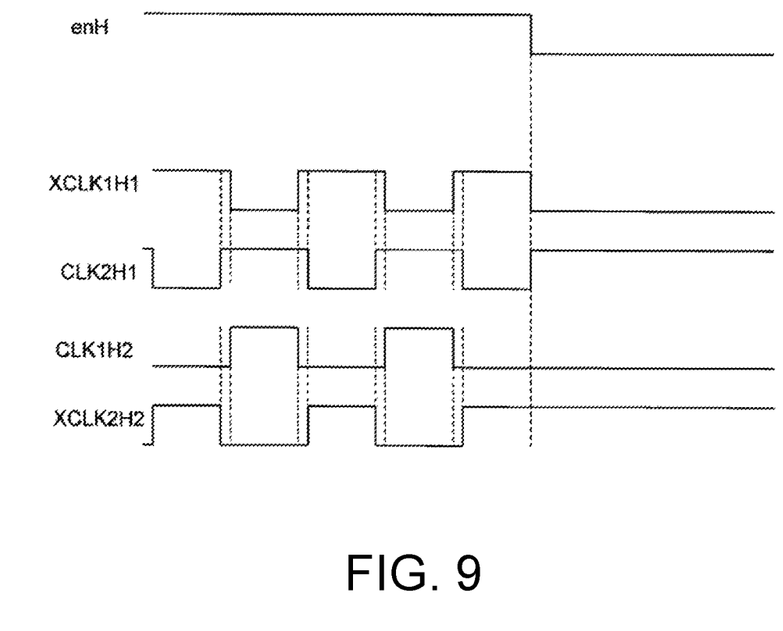
FIG. 9 is a time chart showing the signal changes of various clock signals when the enable signal changes from H level to L level in the voltage generation circuit of the comparative example.

FIG. 9 is a time chart showing examples of the signal changes of various clock signals when the enable signal enH changes from H level to L level in the voltage generation circuit 300 of the comparative example.

Since the enable signal enH is a signal asynchronous with each clock signal, the enable signal enH may change from logic level 1 to logic level 0 while the first charge pump circuit 27 is performing the pumping operation with the inverted first clock signal XCLK1H1 at logic level 1 and the second clock signal CLK2H1 at logic level 0, for example. At this time, unlike the normal operation, the signal level of each clock signal changes without passing through the Hiz period, causing the state (on and off) of each transistor to change. Thus, transistors that are not turned on simultaneously during normal operation may be turned on at the same time, resulting in a through current.

Figure 10:
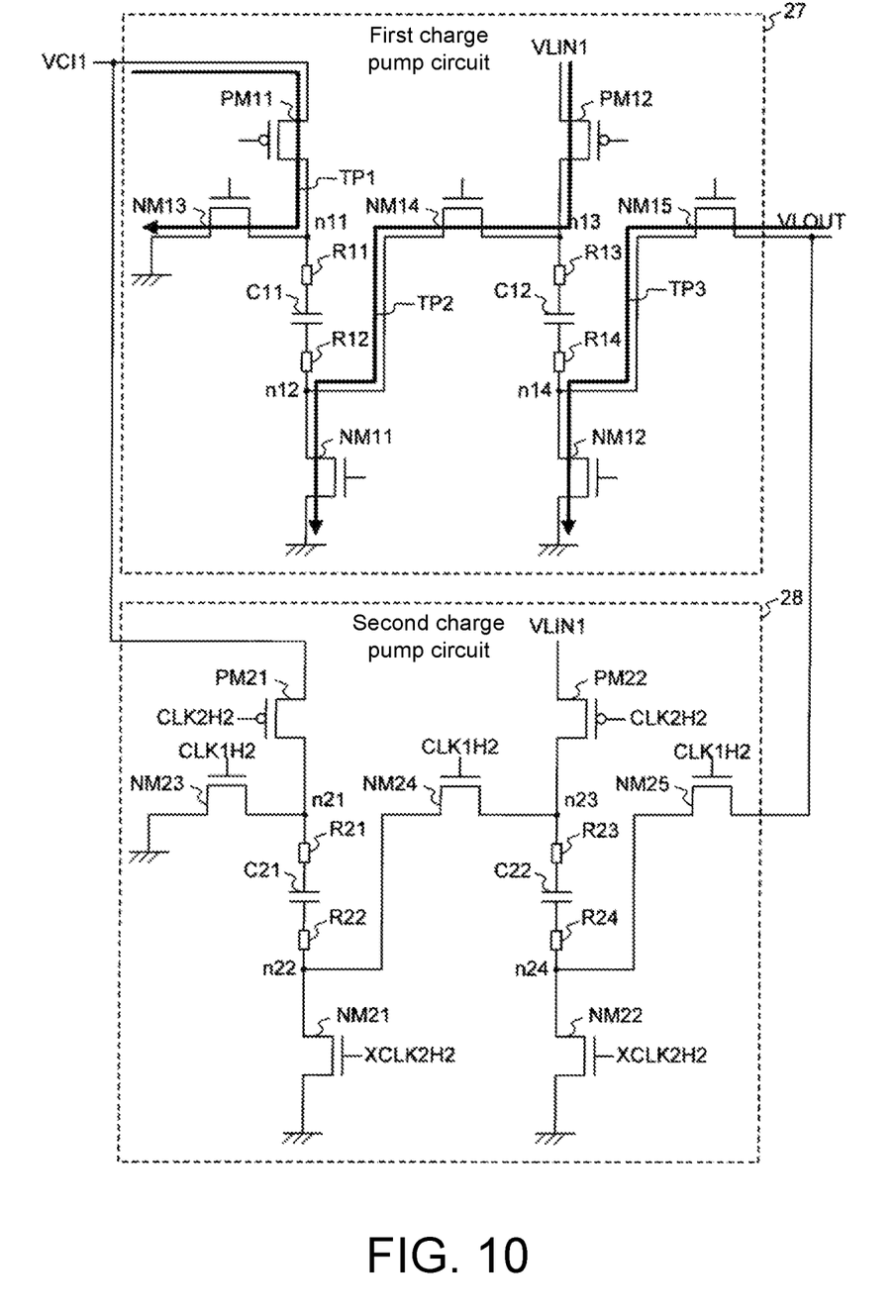
FIG. 10 is a diagram showing an example of the path of a through current that may occur in the voltage generation circuit of the comparative example.

FIG. 10 is a diagram showing an example of the path of a through current that may occur in the first charge pump circuit of the voltage generation circuit 300 of the comparative example. For example, when the transistor PM11 and the transistor NM13 are turned on simultaneously, a through current is generated in the path shown as TP1 in the drawing. Further, when the transistors PM12 and NM11 and the transistor NM14 are turned on simultaneously, a through current is generated in the path shown as TP2 in the drawing. Furthermore, when the transistor NM15 and the transistor NM12 are turned on simultaneously, a through current is generated in the path shown as TP3 in the drawing.

In contrast thereto, in the voltage generation circuit 200 of this embodiment, even if the enable signal enH becomes logic level 0 while the first charge pump circuit 27 is in the pump state, the first enable signal enH1 changes to logic level 0 at the timing when the first charge pump circuit 27 changes to the charge state afterward, and the signal level of each clock signal is fixed, so no through current is generated.

Figure 11:
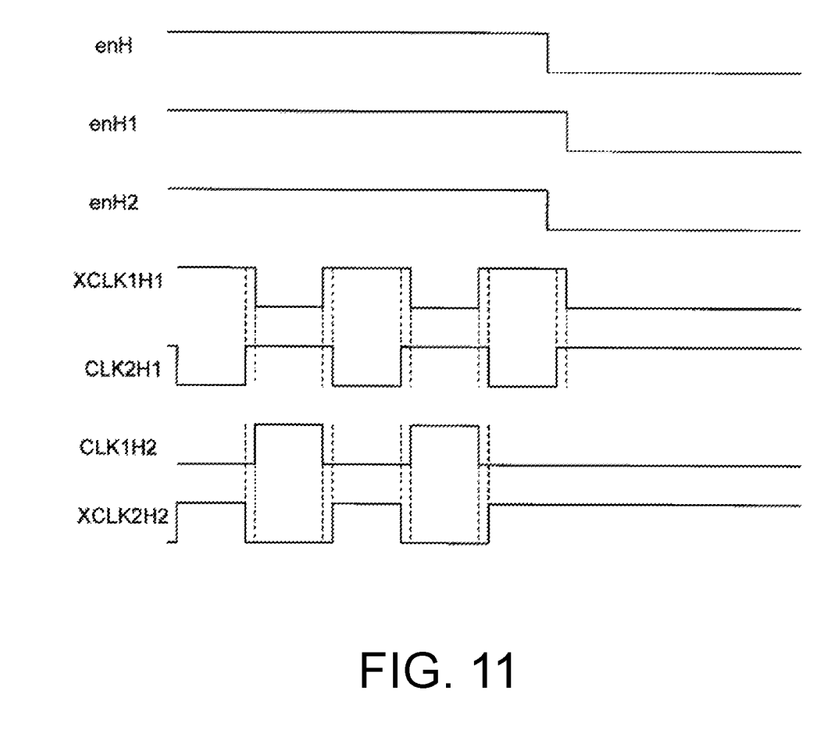
FIG. 11 is a time chart showing the signal changes of various clock signals when the enable signal changes from H level to L level in this embodiment.

FIG. 11 is a time chart showing the signal change of each signal when the enable signal enH changes from logic level 1 (H level) to logic level 0 (L level) in the voltage generation circuit 200 of this embodiment.

The first enable signal enH1 is a signal generated by the first monitoring circuit 25 having the configuration shown in FIG. 6, and is at logic level 0 when the enable signal enH is at logic level 0 and the inverted first clock signal XCLK1H1 is at logic level 0. Accordingly, even if the enable signal enH falls, the first enable signal enH1 does not fall immediately, but then falls at the timing when the inverted first clock signal XCLK1H1 changes to logic level 0.

Therefore, after the inverted first clock signal XCLK1H1 changes from logic level 1 to logic level 0 and turns on the transistors PM11, NM11, PM12, and NM12 of the first charge pump circuit 27, that is, the first charge pump circuit 27 enters the charge state, the first enable signal enH1 becomes logic level 0, and the signal level of each clock signal is fixed.

Accordingly, in the voltage generation circuit 200 of this embodiment, the signal level of each clock signal is fixed at the timing when the operating state of the first charge pump circuit 27 changes, so a through current does not occur as in the comparative example.

Thus, according to the voltage generation circuit 200 of this embodiment, it is possible to prevent generation of a through current when the operation of the charge pump stops.

Nevertheless, the disclosure is not limited to the above embodiment. For example, the above embodiment illustrates a case where generation of a through current can be prevented when the first charge pump circuit 27 and the second charge pump circuit 28 transition from the operating state to the stopped state. However, according to the voltage generation circuit 200 having the above configuration, generation of a through current can be prevented not only when the operation is stopped but also when each charge pump circuit transitions from the stopped state to the operating state.

Furthermore, the circuit configurations of the first charge pump circuit 27 and the second charge pump circuit 28 are not limited to those shown in the above embodiment. The first charge pump circuit 27 and the second charge pump circuit 28 may be configured to include: a first capacitor and a second capacitor each having a predetermined capacitance; a first switch element group that is turned on and off in response to application of a first clock signal and connects a first voltage supply line and the first capacitor when turned on; a second switch element group that is turned on and off in response to application of the first clock signal and connects a second voltage supply line and the second capacitor when turned on; and a third switch element group that is turned on and off in response to application of a second clock signal and connects a voltage output line of an output voltage and the first capacitor and the second capacitor when turned on.

Further, the configuration of the first monitoring circuit 25 is not limited to that shown in the above embodiment, and the first monitoring circuit 25 may be configured to be capable of generating the first enable signal enH1, whose signal level changes to fall when the inverted first clock signal XCLK1H falls while the enable signal enH falls, based on the enable signal enH and the inverted first clock signal XCLK1H.

Furthermore, the above embodiment illustrates a case where the voltage generation circuit 200 is provided in the source driver 14. However, the voltage generation circuit 200 may be provided in the timing controller 12. That is, the voltage generation circuit 200 of this embodiment may be installed in a control device that supplies the power supply voltage to the gate driver 13 and controls the operation thereof.

In addition, according to the above embodiment, the first enable signal enH1 is generated in the first monitoring circuit 25 that operates at HV (high voltage) to control the timing at which the signal level of the enable signal changes. On the other hand, unlike this embodiment, it is also possible to adjust the timing of the signal change of the enable signal in a logic circuit before level shift that operates at LV (low voltage). However, in the case of adjusting the timing of the enable signal at the LV stage, it is necessary to separately prepare a clock signal for the first charge pump circuit 27 and a clock signal for the second charge pump circuit 28, and it is necessary to provide a plurality of level shifters.

Besides, separate processing is required to match the delay of the enable signal and the delay of the clock signal. Therefore, it is preferable to adjust the timing of the signal change of the enable signal in a circuit block after the level shifter that operates at HV, as in this embodiment.

What is claimed is:

1. A voltage generation circuit, comprising:
a charge pump circuit configured to boost an input voltage to generate an output voltage;
a signal supply circuit configured to supply to the charge pump circuit a first clock signal and a second clock signal, which are a pair of signals controlling an operation of the charge pump circuit and in which a predetermined time difference is provided between a timing of a change in signal level of one signal and a timing of a change in signal level of the other signal; and
a control circuit configured to supply to the signal supply circuit a first enable signal that controls start and stop of oscillation of the first clock signal and the second clock signal according to a change in signal level,
wherein the charge pump circuit comprises:
a first capacitor and a second capacitor each having a predetermined capacitance;
a first switch element group configured to be turned on and off in response to application of the first clock signal and connect a first voltage supply line and the first capacitor when turned on;
a second switch element group configured to be turned on and off in response to application of the first clock signal and connect a second voltage supply line and the second capacitor when turned on; and
a third switch element group configured to be turned on and off in response to application of the second clock signal and connect a voltage output line of the output voltage and the first capacitor and the second capacitor when turned on,
wherein the control circuit is configured to control a timing of a signal change of the first enable signal so that the signal levels of the first clock signal and the second clock signal are fixed at a timing when the first switch element group and the second switch element group change from an off state to an on state, in response to stopping oscillation of the first clock signal and the second clock signal.

2. The voltage generation circuit according to claim 1, wherein the first clock signal is a signal that controls the first switch element group and the second switch element group to the on state in response to logic level 0, and controls the first switch element group and the second switch element group to the off state in response to logic level 1, and
the control circuit is configured to control the timing of the signal change of the first enable signal so that the signal levels of the first clock signal and the second clock signal are fixed at a timing when the first clock signal changes from logic level 1 to logic level 0.

3. The voltage generation circuit according to claim 1, wherein the first switch element group comprises a first transistor of a first conductivity type whose source is connected to the first voltage supply line and whose drain is connected to one end of the first capacitor, and configured to be turned on and off in response to application of the first clock signal to a gate; and a second transistor of a second conductivity type whose source is connected to a predetermined potential and whose drain is connected to the other end of the first capacitor, and configured to be turned on and off in response to application of an inverted first clock signal, which is obtained by inverting the first clock signal, to a gate,
the second switch element group comprises a third transistor of the first conductivity type whose source is connected to the second voltage supply line and whose drain is connected to one end of the second capacitor, and configured to be turned on and off in response to application of the first clock signal to a gate; and a fourth transistor of the second conductivity type whose source is connected to a predetermined potential and whose drain is connected to the other end of the second capacitor, and configured to be turned on and off in response to application of the inverted first clock signal to a gate, and
the third switch element group comprises a fifth transistor of the second conductivity type whose source is connected to a predetermined potential and whose drain is connected to one end of the first capacitor, and configured to be turned on and off in response to application of the second clock signal to a gate; a sixth transistor of the second conductivity type whose source is connected to the other end of the first capacitor and whose drain is connected to one end of the second capacitor, and configured to be turned on and off in response to application of the second clock signal to a gate; and a seventh transistor of the second conductivity type whose source is connected to the other end of the second capacitor and whose drain is connected to the voltage output line, and configured to be turned on and off in response to application of the second clock signal to a gate.

4. The voltage generation circuit according to claim 1, wherein the control circuit comprises a NAND gate circuit and is configured to generate the first enable signal based on a NAND between an enable signal supplied from outside and a clock signal that changes in the same phase as the first clock signal.

5. The voltage generation circuit according to claim 1, wherein the charge pump circuit comprises:
a first charge pump circuit comprising the first capacitor, the second capacitor, the first switch element group, the second switch element group, and the third switch element group; and
a second charge pump circuit configured to operate in an opposite phase to the first charge pump circuit.

6. The voltage generation circuit according to claim 5, wherein the second charge pump circuit comprises:
a third capacitor and a fourth capacitor each having a predetermined capacitance;
a fourth switch element group configured to be turned on and off in response to application of the second clock signal and connect the first voltage supply line and the third capacitor when turned on;
a fifth switch element group configured to be turned on and off in response to application of the second clock signal and connect the second voltage supply line and the third capacitor when turned on; and
a sixth switch element group configured to be turned on and off in response to application of the first clock signal and connect the voltage output line and the third capacitor and the fourth capacitor when turned on.

7. A control device, configured to supply a power supply voltage to a gate driver and control an operation of the gate driver, wherein the gate driver is connected to a display panel, which comprises a plurality of data lines, a plurality of gate lines, and a plurality of pixel portions provided in a matrix respectively at intersections of the plurality of data lines and the plurality of gate lines, and the gate driver is configured to supply a gate signal to the plurality of gate lines, the control device comprising:
- a charge pump circuit configured to boost an input voltage to generate the power supply voltage;
- a signal supply circuit configured to supply to the charge pump circuit a first clock signal and a second clock signal, which are a pair of signals controlling an operation of the charge pump circuit and in which a predetermined time difference is provided between a timing of a change in signal level of one signal and a timing of a change in signal level of the other signal; and
- a control circuit configured to supply to the signal supply circuit a first enable signal that controls start and stop of oscillation of the first clock signal and the second clock signal according to a change in signal level, wherein the charge pump circuit comprises:
- a first capacitor and a second capacitor each having a predetermined capacitance;
- a first switch element group configured to be turned on and off in response to application of the first clock signal and connect a first voltage supply line and the first capacitor when turned on;
- a second switch element group configured to be turned on and off in response to application of the first clock signal and connect a second voltage supply line and the second capacitor when turned on; and
- a third switch element group configured to be turned on and off in response to application of the second clock signal and connect a voltage output line of the power supply voltage and the first capacitor and the second capacitor when turned on, wherein the control circuit is configured to control a timing of a signal change of the first enable signal so that the signal levels of the first clock signal and the second clock signal are fixed at a timing when the first switch element group and the second switch element group change from an off state to an on state, in response to stopping oscillation of the first clock signal and the second clock signal.

8. The control device according to claim 7, wherein the control device is built in a source driver configured to supply a gradation voltage signal to the plurality of pixel portions via the plurality of data lines based on a video data signal.

* * * * *